United States Patent [19]

Testa et al.

[11] 4,429,580
[45] Feb. 7, 1984

[54] STRESS TRANSDUCER FOR FABRICS AND FLEXIBLE SHEET MATERIALS

[75] Inventors: Rene B. Testa, Demarest, N.J.; Wassief M. Boctor, Rego Park, N.Y.

[73] Assignee: Rene B. Testa, Demarest, N.J.

[21] Appl. No.: 347,366

[22] Filed: Feb. 9, 1982

[51] Int. Cl.³ .............................................. G01B 7/18
[52] U.S. Cl. ...................................... 73/768; 73/775; 73/159
[58] Field of Search ................. 73/763, 768, 775, 776, 73/783, 774, 767, 159, 862.69, 862.66, 862.39, 862.67

[56] References Cited
U.S. PATENT DOCUMENTS 4,038,867  8/1977  Andrews et al. ..................... 73/775

Primary Examiner—Jerry W. Myracle

[57] ABSTRACT

A transducer assembly for monitoring stress in flexible sheet material, by responding directly to stress in the sheet and providing an electrical output which is related to the magnitude of biaxial stresses in the sheet. A transducer, for example of a suitable epoxy, is cast as an inclusion through which the stresses from the material are transferred. According to a preferred embodiment, a hole is made in the fabric material and the coating, if present, is removed from adjacent yarns about the edge of the hole to form an annular region to which the transducer then is securely bonded. If a non-yarn material is used then the epoxy is formed about the material per se. One or more electrical strain gages are affixed to the transducer, to directly sense stresses in the material which are transmitted to the transducer. In other embodiments the transducer is an integral part of a piece of sheet material which in turn is spliced into the overall material to be monitored.

11 Claims, 6 Drawing Figures

STRESS TRANSDUCER FOR FABRICS AND FLEXIBLE SHEET MATERIALS

BACKGROUND OF THE INVENTION

This invention relates to the measurement of stresses or loads in fabrics of other flexible sheet materials under general states of biaxial stress. In particular, a transducer assembly with output from electrical resistance strain gages is developed to measure the biaxial state of stress in materials such as coated and uncoated fabrics and flexible sheet materials.

Heretofore, conventional methods of measuring stress or strain in fabrics have proved ineffective and/or cumbersome. Electrical resistance strain gages cannot be cemented directly to the uneven surface of the yarns, and in coated fabrics or other flexible sheet materials, such gages have a stiffening effect which causes disruption of the strain field being measured. For example, in coated fabrics, a gage causes the coating, to which it is cemented, to deform less than the underlying fabric, and hence indicate an incorrect strain. Mechanical extensometers do not provide an easily processed electrical output signal as would an electrical extensometer (for example using LVDT's), but both suffer from the need for a large length over which the strain is averaged and difficulties in installing more than one extensometer at a point to measure biaxial strains. Such extensometers also tend to be cumbersome and interfere with the stresses and strains present in the sheet. Other arrangements have used helically coiled strain gage wire to reduce the stiffening effect of the transducer, but such an arrangement is adversely affected by very slight bending or twisting, and measurement in more than one direction at a point is made difficult. Optical methods of measuring the distortion of a target imprinted on the sheet are not sufficiently sensitive for accurate determination of small strains, and they are cumbersome to use because they are not easily automated. All of the methods using extensometers or other transducers to measure strains in the flexible sheet require a knowledge of the material properties in order to compute the stresses. Often the biaxial stress-strain properties are not known well enough, or are not constant from one sample to another, to permit accurate computation of the stresses from the measured strains. In yet another arrangement, a transducer for load measurement uses a strain gage on a flat link which is secured at each end to a yarn. This arrangement can only be used to measure the load in one direction at a point. Typical disclosures of the prior art arrangements may be found in U.S. Pat. Nos. 3,118,301 and 4,038,867.

SUMMARY OF THE INVENTION

The present invention overcomes the foregoing difficulties encountered with existing methods of stress measurement in flexible sheet material by providing an improved transducer assembly which can respond directly to the stress in the sheet, and provide an electrical output which can be related to the magnitude of the biaxial stresses. The transducer has the advantages of giving an accurate direct measure of biaxial stresses, it is durable, and its output can be processed electronically.

The foregoing and other advantages which will become apparent from the following description of a preferred embodiment of the invention, are attained by providing transducer which comprises a disc of epoxy or other suitable resin cast as an inclusion through which the stresses from the material yarns or material per se are transferred. For this purpose, a hole is made in the material, and the coating (if one is present) is removed or stripped from the yarns over some distance from the edge of the hole. This forms an annular region of yarn to which the transducer is securely bonded. If the material is of a non-yarn variety then the epoxy transducer is formed about the edge of the material directly adjacent the formed hole. Electrical resistance strain gages are affixed suitably to the transducer with their axes oriented in the directions of the yarns in the material, although other orientations may be used. The present transducer assembly is not restricted to materials comprised of yarns, but also may be applied to flexible sheet material without yarns.

BRIEF DESCRIPTION OF THE DRAWINGS

With reference to the accompanying drawings.

DESCRIPTION OF PREFERRED EMBODIMENT

Figure 1:
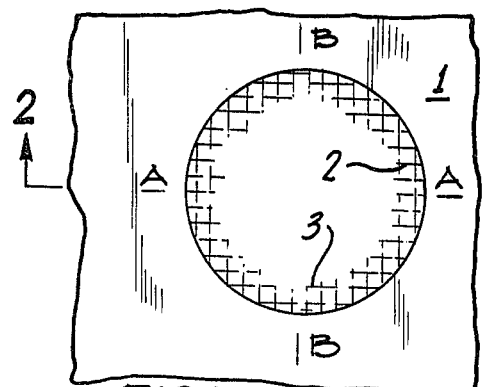
FIG. 1 is a plan view of a coated fabric sample with a circular hole and an annular region where the yarns have been exposed by stripping away the coating, which region is adapted to have the transducer disc secured thereto.
Figure 2:
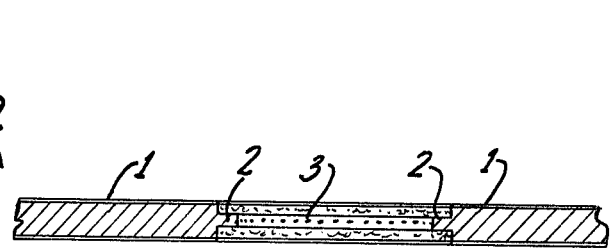
FIG. 2 is a cross-sectional view taken substantially along line 2—2 in FIG. 1.

Referring now to the accompanying drawings wherein like parts are denoted by the same reference character throughout the several views, there is shown in FIG. 1, a circular hole of opening 3 is formed in the fabric 1 at a location where the transducer according to the present invention is to be installed. The diameter of the hole must be large enough to accomodate the strain gages which will be used on the disc transducer. A typical dimension for the hole would be one-half inch. If a coated fabric is used, the coating is then stripped from the yarns in an annular region 2 directly adjacent or contiguous around the hole and large enough to provide sufficient bonding surface of the transducer disc to the yarns. This is best illustrated in FIG. 2. Typically, the yarns will be exposed in a one-eighth inch annulus. Care must be exercised that the yarns not be damaged in stripping the coating which may be accomplished with solvents, heat or other conventional means. If a non-yarn material is used then the transducer is bonded directly to the surface adjacent the hole by overlapping the edge surface (see FIG. 6).

Figure 3:
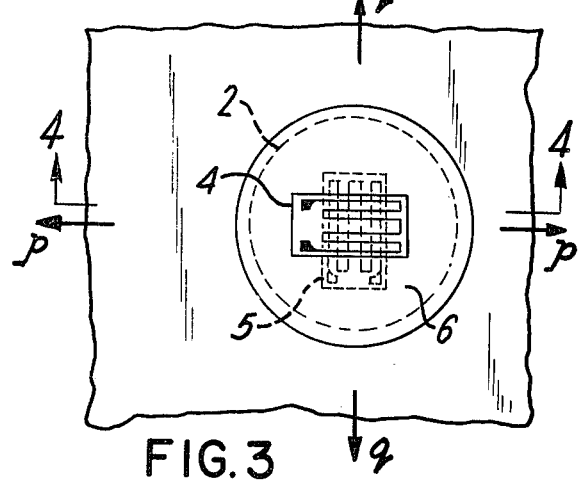
FIG. 3 is a plan view of the present invention showing the transducer secured in place and a preferred arrangement of strain gages affixed to opposite surfaces of the transducer.
Figure 4:
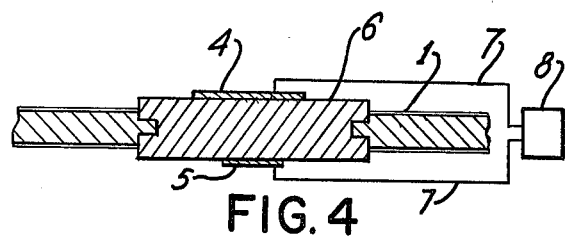
FIG. 4 is a cross-sectional view of the transducer assembly of the present invention taken substantially along line 4—4 in FIG. 3.

Referring to FIG. 3, there is shown a transducer in the form of a disc 6 cast of commercially available epoxy resins, liquid metal epoxy, or other resin which will cure to a uniform, sufficiently stiff and strong solid. Other configurations of the transducer, e.g. rectangular, etc. are also possible. The epoxy bonds to the exposed yarns in the annular region 2. A suitable form or mold can be used to form the desired transducer in place on the material. The top and bottom surfaces of the disc 6 are finished flat and equidistant from the median plane of the fabric 1. This can be done by filing or milling or other suitable means. A guide or template may be employed to form the transducer to the desired size and thickness. In one embodiment of the invention, resistance strain gages 4 and 5 are cemented to the opposite surfaces of the disc 3. Gage 4 is aligned with the warp direction A—A; gage 5 is aligned with the fill direction B—B.

In describing the operation of the transducer assembly of this invention, consider the fabric 1 in FIG. 3 being subjected to stresses denoted p and q (per unit length) acting in the warp and the fill directions, respectively, at the point in question. These stresses are transmitted to the transducer disc 6 through the annular interface 2 in FIG. 3. It is an essential feature of this transducer arrangement, that the disc interrupts the stress field in the fabric and carries those stresses itself, thereby responding directly to the stresses in the fabric. The stress condition in the transducer disc will be approximately uniform for the circular disc shown here, as well as for certain other shapes, thus facilitating monitoring by strain gages 4 and 5 in FIG. 3. The electrical outputs from the gage(s) are fed by electrical leads to standard electronic processing/computer equipment which can combine and amplify the individual transducer strains according to the caliberation graph, to produce direct readings of stresses in the material. The material of the transducer disc is selected to be stiff enough for use of the foil gages 4 and 5. For each biaxial stress state p and q in the fabric, there will be corresponding strain readings $\epsilon p$ and $\epsilon q$ in the gages 4 and 5 of FIG. 3.

Figure 5:
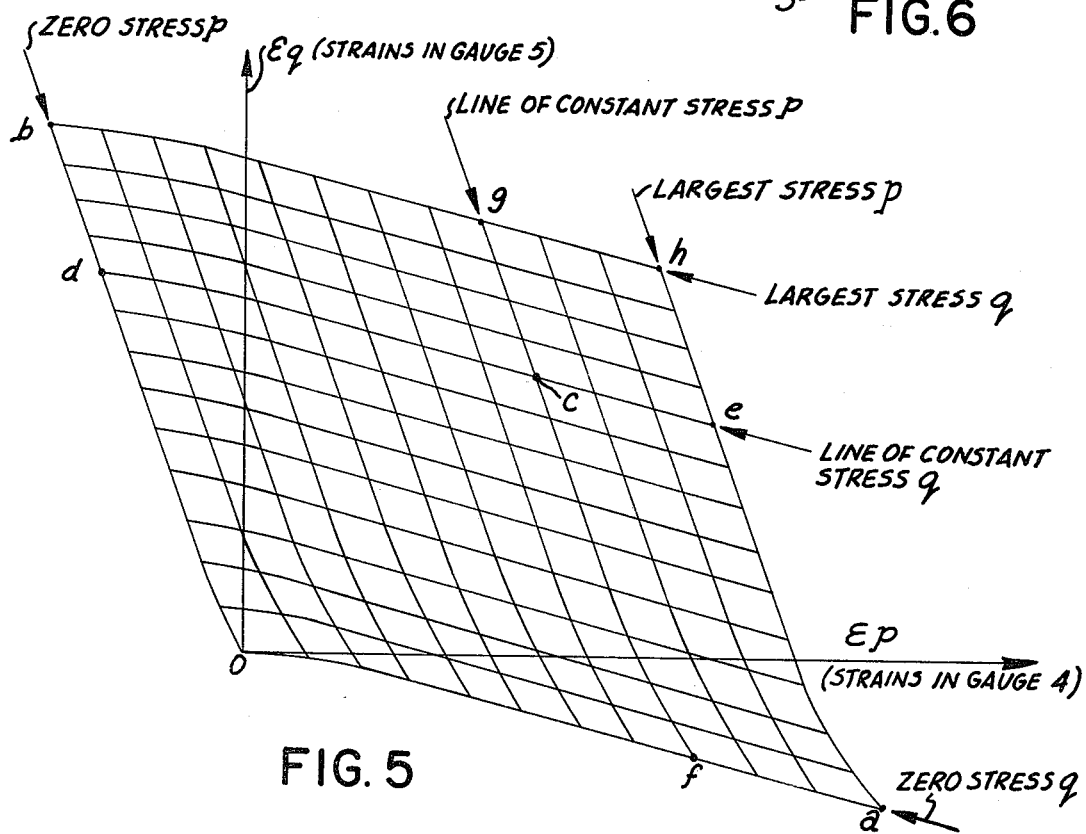
FIG. 5 is a sample calibration diagram for the transducer according to the present invention.

Referring to FIG. 5, the correspondence between the strains measured in the transducer disc, $\epsilon p$ and $\epsilon q$, and the fabric stresses p and q is shown typically by a graph on which each point corresponds to both a pair of strains and a pair of stresses. The strains in the disc are read on the coordinate axes while the fabric stresses are denoted by the grid of lines representing lines of constant stress p (lines such as fcg) and constant stress q (lines such as dce). Lines ofa and odb represent uniaxial stress states in the directions p and q, respectively. Lines aeh and bgh represent the largest stresses p and q for which the transducer is calibrated. The grid o a h b thus represents the calibration diagram for the transducer. Any pair of values of $\epsilon p$ and $\epsilon q$ measured in the transducer disc can be entered in FIG. 5 along the coordinate axes to locate a point such as c. The value of p for the line fcg and the value of q for the line dce, the grid lines passing through the point c, define the fabric stresses.

The transducer assembly herein described relies on the transfer of stresses from a fabric or flexible sheet material to an inclusion, which is better suited to measurement and continuous monitoring than the material itself. The invention finds particular application to the measurement of biaxial stresses in a coated fabric, but it is clearly applicable to uniaxial stress measurements in coated fabrics and to other flexible sheet materials. These fabrics are useful particularly in structural applications or geotechnical applications below ground. The coating typically is vinyl or Teflon. Other materials are parachute fabric and artificial membranes or tissues for biomedical applications.

Figure 6:
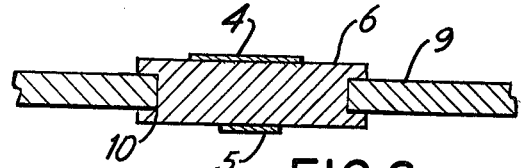
FIG. 6 is an alternate embodiment of the present invention with a non-yarn material.

While preferred embodiments of the invention have been described in the present illustration, various modifications are possible without departing from the scope of the invention as defined in appended claims. Such alternative embodiments might include inclusion shapes other than circular which can be employed without significantly deviating from the concept, although circular or elliptical inclusions are preferred. As illustrated in FIG. 6, the transducer is formed in overlapping relation with respect to the edge surface of the opening in the non-yarn material, to which it is bonded. Its opposed surfaces extend beyond the material surfaces and have strain gages secured thereto as in the embodiment of FIG. 1. Other means of monitoring the stress or strain in the transducer can be employed in place of the electrical resistance strain gages in the present embodiment. For example, while not shown three element rosettes can be employed to monitor the inclusion strains and thereby determine fabric shear stresses as well as the normal stresses p and q. Also, the strain gages need not be aligned with specific axes of the sheet material or fabric. The transducer may be installed and calibrated in a separate fabric panel which in turn can be spliced into a larger structure in which the stresses are to be measured. It is possible to create an inclusion for the transducer without actually cutting a hole but simply by adequately bonding a sufficiently rigid transducer to the fabric yarns. The calibration of the transducer may be presented in forms other than the graph described herein. It is to be understood that materials and dimensions other than those described herein could be used without substantial deviation from the present invention.

We claim as our invention:

1. A transducer assembly for measuring stress in material, comprising transducer means mounted in an opening in said material and bonded substantially continuously about said opening such that said transducer means comprises an inclusion relative to said material for directly sensing stresses which develop therein.

2. A transducer assembly according to claim 1 including gage operably secured with said transducer means for sensing stresses in said material.

3. A transducer assembly according to claim 1 wherein said transducer means comprises a disc bonded to the edge directly adjacent said opening in which said disc is located.

4. A transducer assembly according to claim 1 wherein said transducer means has a predetermined plan shape and thickness to optimize the transducer output for a particular material and stress field.

5. A transducer assembly according to claim 1 wherein said transducer means includes an electrical resistance strain gage affixed to at least one face thereof in the direction of reinforcement in said material.

6. A transducer assembly according to claim 1 wherein said transducer means includes an electrical resistance strain gage affixed to at least one face thereof in the direction of the material stresses to be monitored.

7. A transducer assembly according to claim 1 including means for measuring strains in said transducer means operably connected therewith, said transducer constructed so as to operably relate the strains in the said transducer means to the stresses in the material in which the transducer means is secured.

8. A transducer assembly according to claim 1 wherein said transducer means is secured in a patch of material similar to the material in which stress is to be measured, and spliced into position with said material after calibration of the transducer assembly with the patch of material.

9. A transducer assembly according to claim 1 wherein said material is comprised of yarns for reinforcement, with a predetermined annular region of said yarns being exposed directly adjacent said opening, and said transducer means being bonded with said yarns only in said annular region.

10. A transducer assembly according to claim 1 wherein said transducer means is bonded in overlapping relation with respect to said material on opposite faces thereof.

11. A method of monitoring stress in material subjected to stress comprising the steps of:
forming a transducer from an epoxy as an inclusion in said material whose stress is to be monitored, securely bonding said transducer near its periphery to said material in the vicinity of the edge surface defining an opening in which said transducer is located in said material and affixing at least one strain gage to said transducer.

* * * * *